US011525358B2

(12) United States Patent
Abrari et al.

(10) Patent No.: US 11,525,358 B2
(45) Date of Patent: Dec. 13, 2022

(54) INTERFERENCE FIT CONTROL FOR THE ASSEMBLY OF ROTARY PARTS

(71) Applicant: PRATT & WHITNEY CANADA CORP., Longueuil (CA)

(72) Inventors: Farid Abrari, Mississauga (CA); Bernard Chow, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 29 days.

(21) Appl. No.: 17/177,238

(22) Filed: Feb. 17, 2021

(65) Prior Publication Data
US 2022/0259974 A1    Aug. 18, 2022

(51) Int. Cl.
*F01D 5/02*     (2006.01)
*F16D 1/08*     (2006.01)
*F01D 5/06*     (2006.01)

(52) U.S. Cl.
CPC ........... *F01D 5/025* (2013.01); *F16D 1/0858* (2013.01); *F01D 5/06* (2013.01); *F05D 2220/323* (2013.01)

(58) Field of Classification Search
CPC ........... F01D 5/025; F01D 5/06; F16D 1/0858
See application file for complete search history.

(56) References Cited

U.S. PATENT DOCUMENTS

| 3,718,957 A | 3/1973 | Shank | |
| 7,287,960 B2 * | 10/2007 | Decker | F16D 1/027 |
| | | | 416/213 R |
| 7,661,260 B2 * | 2/2010 | Moniz | F01D 5/026 |
| | | | 60/39.162 |
| 10,975,707 B2 * | 4/2021 | Paradis | F01D 5/02 |
| 2019/0218921 A1 | 7/2019 | Breen | |
| 2019/0338644 A1 * | 11/2019 | Bentley | F01D 5/026 |
| 2019/0383331 A1 * | 12/2019 | Garabello | F02C 7/36 |
| 2020/0248630 A1 * | 8/2020 | Garabello | F16D 3/06 |
| 2022/0065166 A1 * | 3/2022 | Mittelstaedt | F02C 7/06 |

FOREIGN PATENT DOCUMENTS

| DE | 102015226218 A1 * | 6/2017 | B23P 11/00 |
| JP | 5535678 B2 | 7/2014 | |

OTHER PUBLICATIONS

"Spline Engineering Design Formula", Engineers Edge www.engineersedge.com Aug. 15, 2016 capture (Year: 2016).*
European Search Report issued in counterpart application 22156443.8 dated May 3, 2022.

* cited by examiner

*Primary Examiner* — Igor Kershteyn
*Assistant Examiner* — Brian Christopher Delrue
(74) *Attorney, Agent, or Firm* — Norton Rose Fulbright Canada LLP

(57) ABSTRACT

A rotary assembly for an aircraft engine is disclosed. A shaft is mounted for rotation about a central axis and a rotary part is mounted on the shaft for common rotation therewith. The rotary part has an axial end portion extending away from a center of mass of the rotary part, the axial end portion having a radial thickness smaller than that of the rotary part at an axial location aligned with the center of mass. The shaft and the rotary part have an interface defining an interference fit between the shaft and the axial end portion of the rotary part. The interface is located at a distance along the central axis from the center of mass. An undercut is defined in the rotary part. The undercut extends axially from adjacent the interface towards the center of mass.

20 Claims, 3 Drawing Sheets

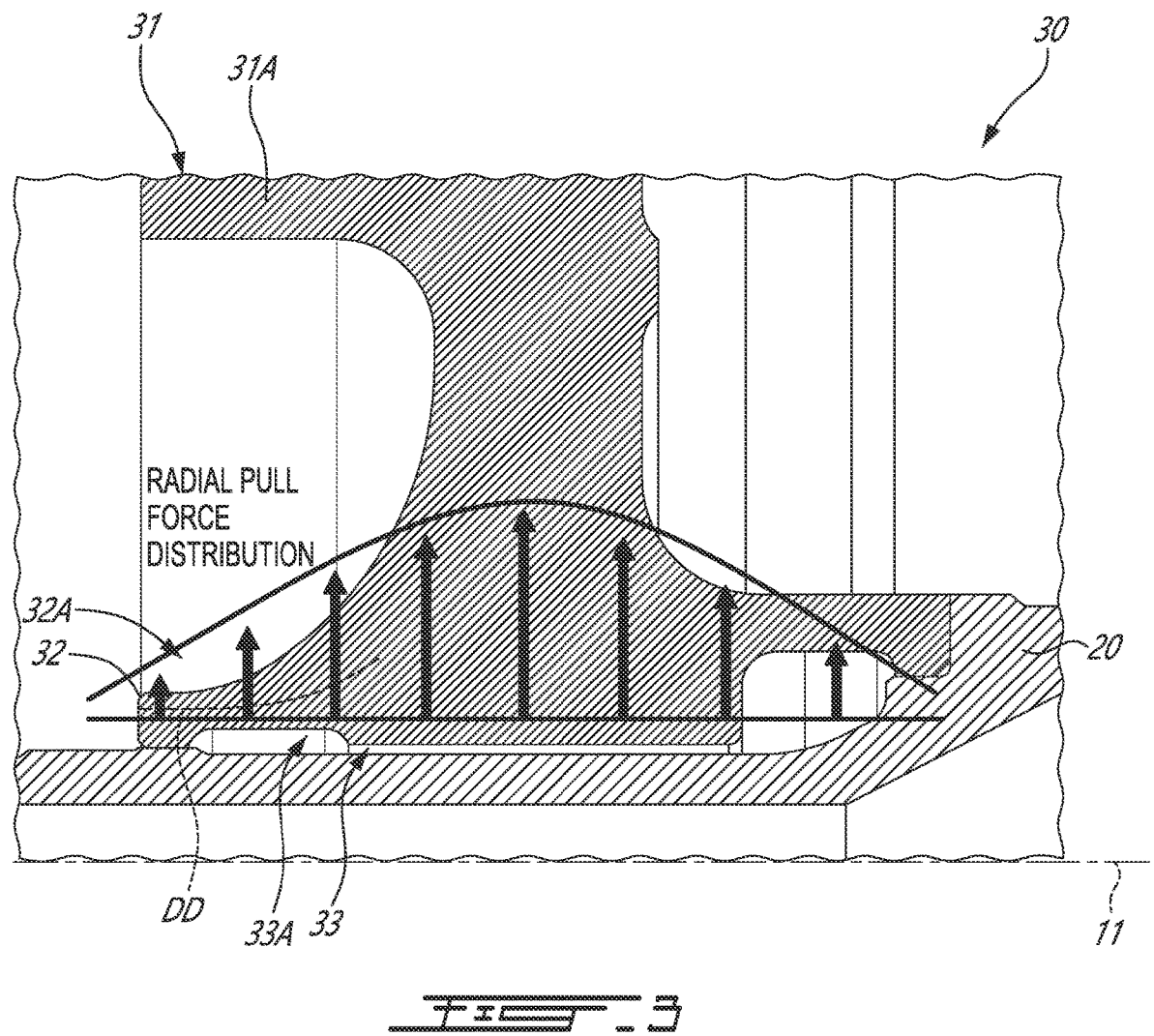

INTERFERENCE FIT CONTROL FOR THE ASSEMBLY OF ROTARY PARTS

TECHNICAL FIELD

The application relates generally to aircraft engines and, more particularly, to the assembly of rotary parts such as engine rotors.

BACKGROUND OF THE ART

Aircraft engine parts rotating at high speed may experience high centrifugal loads and thermal expansion in normal operating conditions. Rotors, such as compressor rotors, coupled to a shaft, or other rotary parts mounted one to another within the engine may experience such high centrifugal loads and thermal expansion. Radial pull due to the centrifugal loads and/or thermal expansion of one such rotary part relative to the other over a range of running conditions of the engine may cause variations in the interference fit, for instance relaxing of the fit, between these rotary parts.

SUMMARY

In one aspect, there is provided a rotary assembly for an aircraft engine, the rotary assembly comprising: a shaft mounted for rotation about a central axis; a rotary part mounted on the shaft for common rotation with the shaft, the rotary part having an axial end portion extending away from a center of mass of the rotary part, the axial end portion having a radial thickness smaller than that of the rotary part at an axial location aligned with the center of mass, the shaft and the rotary part having an interface defining an interference fit between the shaft and the axial end portion of the rotary part, the interface located at a distance along the central axis from the center of mass; and an undercut defined in the rotary part, the undercut extending axially from adjacent the interface towards the center of mass.

In another aspect, there is provided a rotary assembly of an aircraft engine, comprising: a shaft mounted for rotation about a central axis; a rotor mounted on the shaft for common rotation, the rotor including a rotor hub coupled to the shaft, the rotor hub having an axial center and an arm portion extending away from the axial center; an interface defining an interference fit between the shaft and the arm portion, the interface located at a distance along the central axis from the axial center; an undercut defined in the rotor hub, the undercut extending from adjacent the interface towards the axial center.

In a further aspect, there is provided a method for controlling a radial pull in a rotary assembly of an aircraft engine, the rotary assembly comprising at least one rotary part mounted to a shaft for joint rotation about a central axis, the at least one rotary part and the shaft having an interference fit, the method comprising: spacing a part-shaft interface defining the interference fit from a center of mass of the at least one rotary part along the central axis, and promoting a deflection of a portion of the at least one rotary part via an undercut defined in the portion of the at least one rotary part and extending from the part-shaft interface towards the center of mass.

DESCRIPTION OF THE DRAWINGS

Reference is now made to the accompanying figures in which:

FIG. 3 is another partial view of the cross-section of the rotary assembly shown in FIG. 2, with a schematic representation of a radial pull force distribution on the rotary assembly in operation.

DETAILED DESCRIPTION

Figure 1:
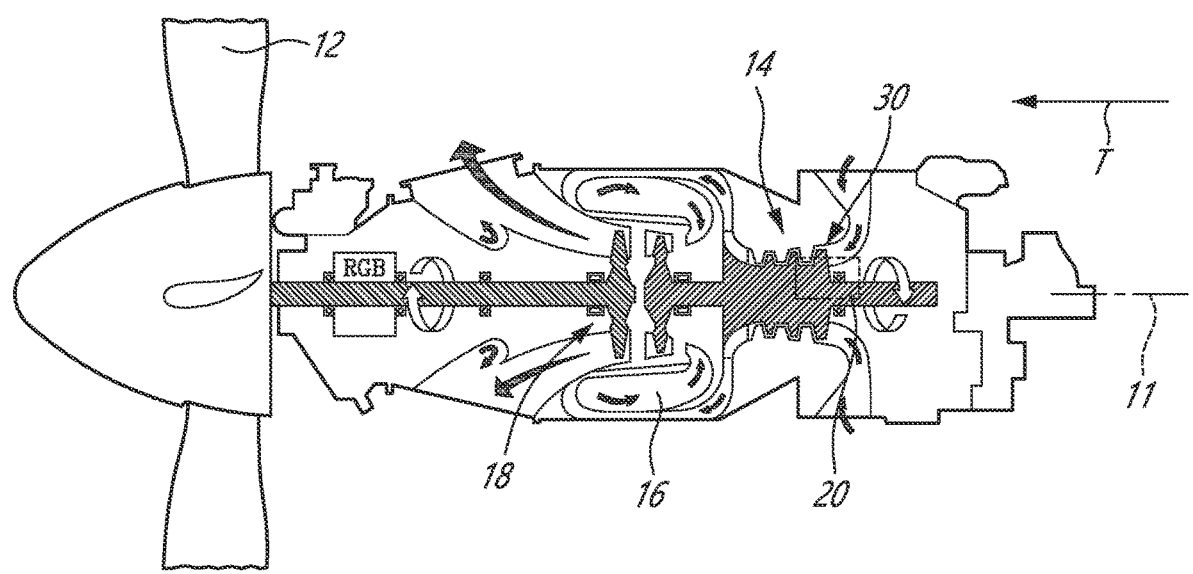
FIG. 1 is a schematic cross-sectional view of a gas turbine engine.

FIG. 1 illustrates a gas turbine engine 10 of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the term "axial", "radial", and "circumferential" are used with respect to a central axis 11, which is in at least some embodiments a central axis of an engine shaft 20, such as a compressor section shaft of the gas turbine engine 10 as shown in FIG. 1. The gas turbine engine 10 is depicted as a reverse-flow engine in which the air flows in the engine 10 from a rear of the engine 10 to a front of the engine 10 relative to a direction of travel T of the engine 10. This is opposite to a through-flow engine in which the air flows within the engine 10 in a direction opposite the direction of travel T, from the front of the engine towards the rear of the engine 10. The principles of the present disclosure may apply to reverse-flow and through flow engines and to any other aircraft engines, such as a turbofan engine and a turboprop engine.

Figure 2:
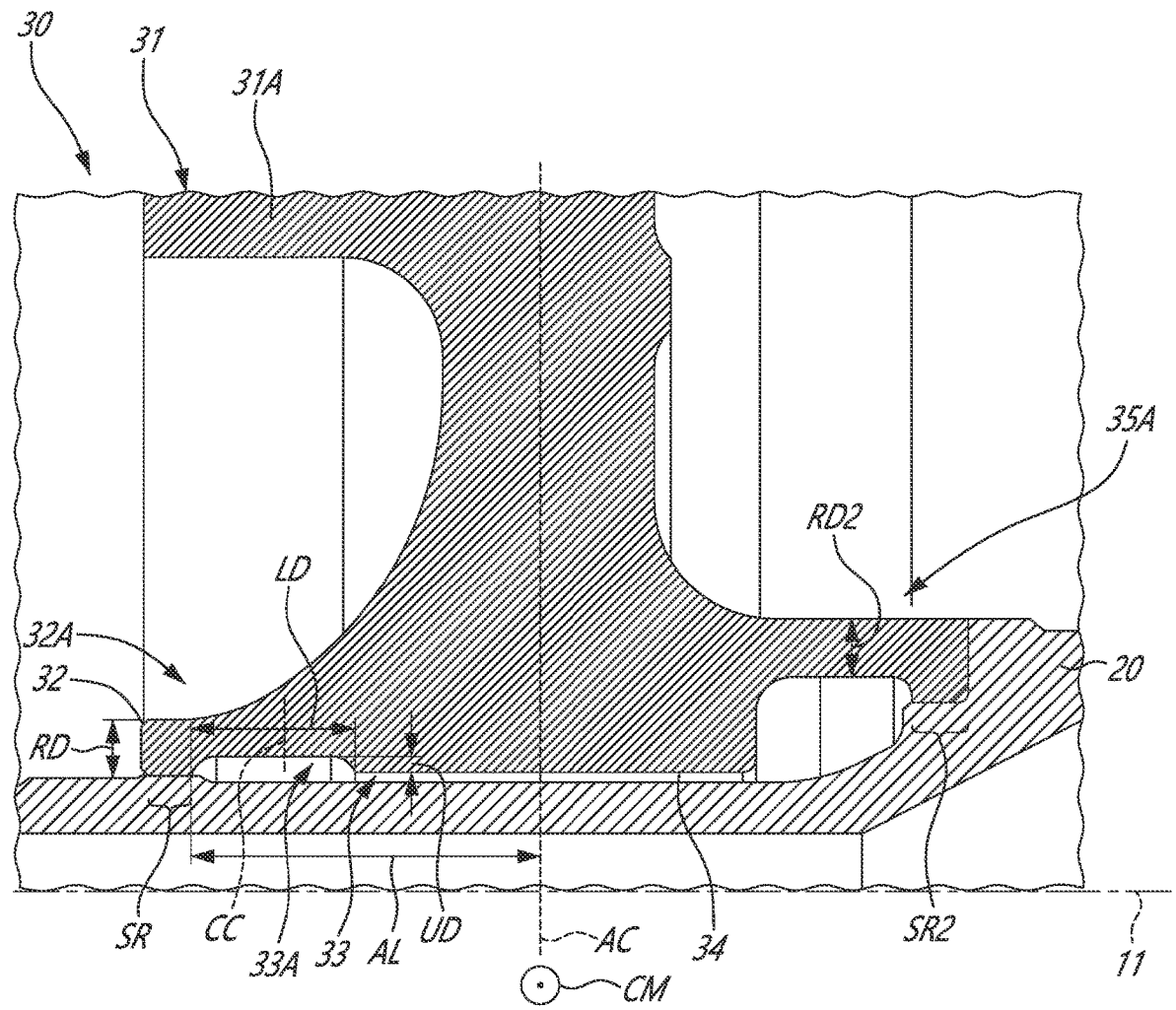
FIG. 2 is a partial view of a cross-section of an exemplary rotary assembly of the gas turbine engine of FIG. 1, according to an embodiment.

The gas turbine engine 10 has a plurality of rotary assemblies, an exemplary one being shown at 30 in the compressor section 14. However, it is understood that the exemplary rotary assembly 30 could be disposed in other sections of the engine 10, such as in the turbine section 18. As best shown in FIG. 2, the rotary assembly 30 generally comprises a rotary part 31 (e.g. a compressor rotor) mounted to a shaft 20 for joint rotation therewith about axis 11. Bearing(s) may be used for rotatably supporting the shaft 20 and thus the rotary parts mounted thereto within the engine 10.

Coupling between engine parts may be made in various ways, one of which being via an interference fit also referred to as a shrink fit. The interference fit is provided at an interface SR between male/female rotary parts. In the illustrated example, the interface SR defines a common boundary between the rotary part 31 and the shaft 20. In at least some embodiments, the interference fit may be provided at axially spaced-apart interfaces SR. An interference fit induces a compressive stress at the interface SR, whereby a joint is formed to secure by friction the first and second interfaced parts (e.g. rotary part 31 and shaft 20). Interference fit may be obtained by thermally expanding a first part (e.g. rotary part 31), or a portion thereof, to relax a fit between such first part and a second part (e.g. shaft 20) on which the first part will be mounted. Such technique may be performed when mounting rotary part 31 on shaft 20, for instance. Dimensions of the shaft 20, such has an outer diameter, and of the rotary part 31, such as an inner diameter, at the interface SR may allow an interference fit coupling.

In the illustrated example, the rotary part 31 is coupled to the shaft 20 via an interference fit at the interface SR of the shaft 20 and the rotary part 31. As will be described later, it is understood that while the exemplified interface SR is a rotor-shaft interface, according to other embodiments, the interference fit could be provided between other rotary parts of the engine 10. As schematically illustrated in FIG. 3, in operation, centrifugal forces (CF) may cause the rotary part 31 to be pulled radially (or "grow" radially) as the rotary assembly 30 rotates at high revolutions. Such CF may be represented as a force vector extending from a center of mass CM of the rotary part 31 (FIG. 2). While CF also applies to the shaft 20, a mass differential between the shaft 20 and the rotary part 31 may cause a CF pull differential between the shaft 20 and the rotary part 31. In other words, the fit between the rotary part 31 and the shaft 20 may relax because of the CF differential. In normal running conditions, a thermal expansion differential between the shaft 20 and the rotary part 31 may occur, which may also affect the relaxation of the fit between the rotary part 31 and the shaft 20. Such relaxation of the fit may induce vibrations within the engine 10 during operation. Controlling and/or tuning of the interference fit while accounting for these phenomenon through all normal running conditions may limit such vibrations and/or displacement of the rotary part 31 with respect to the shaft 20 in at least some embodiments.

In the depicted embodiment, the rotary part 31 is a compressor rotor having a rotor hub 31A. The rotor hub 31A has an axial center AC. In the context of the present disclosure, the axial center AC means the location at equal distance from opposite axial ends of the rotor hub 31A. In FIG. 2, the axial center AC is illustrated as a plane normal to the central axis 11.

Because of its geometry, the rotor hub 31A has an uneven mass distribution. The rotor hub 31A has a mass concentration at the axial center AC. The mass distribution of the rotor hub 31A decreases in an axial direction away from the axial center AC. As can be seen in the cross-section of FIG. 2, most of the material is localized towards the axial center AC, and axial ends of the rotor hub 31A includes portions of reduced material thickness. In at least some embodiments, the axial center AC of the rotor hub 31A is aligned with the center of mass CM of the rotary part 31, here the compressor rotor. It should be understood that the location of the center of mass CM may vary depending on the embodiments. For instance, the rotary part 31 may include one or more parts supported by the rotor hub 31A, such as rotor blades, having their respective masses and positions with respect to the axial center AC of the rotor hub 31A. Such one or more other parts of the rotary part 31 may influence the mass distribution of the rotary part 31, hence the relative position of the axial center AC and the center of mass CM. The position of the center of mass CM may be determined by computation/computer modeling, for instance.

The geometry of the rotary part 31, for instance close to the interface SR, here at the rotor hub 31A, may influence the magnitude of the radial pull caused by CF on the rotary part 31 along the shaft 20. The rotor hub 31A has a tapering portion extending along the shaft 20, away from the center of mass CM and/or away from the axial center AC. As shown, the rotor hub 31A has an axial end portion 32A with a radial thickness RD, which may also be referred to as radial material dimension, smaller than that of the rotor hub 31A at an axial location aligned with the axial center AC and/or center of mass CM. The axial end portion 32A may deflect during operation of the engine 10 at normal running conditions as the radial pull is induced on the rotor hub 31A. As shown, the axial end portion 32A has a cross-section dimension CC tuned to allow deflection of the axial end portion 32A when radial pull of the mass of the rotary part 31 is induced during rotation. Such smaller cross-section CC and locally reduced mass compared to the rotor hub 31A closer to the axial center AC and/or center of mass CM may induce less radial pull locally and/or allow deflection of the axial end portion 32A when such radial pull is induced on the rotor hub 31A and/or the rotary part 31 as a whole. The axial end portion 32A may thus define a deflection area (or "deflectable region") of the rotor hub 31A in a radially inward portion of the rotor hub 31A coming in engagement with the shaft 20. A schematic representation of a radial pull force distribution on the rotary assembly 30 in operation is represented with a field vector of varying amplitude in FIG. 3, juxtaposed to the rotary part 31/rotor hub 31A partially shown in FIG. 2. The deflection of the axial end portion 32A is also represented in FIG. 3 with a dotted line DD to illustrate this.

With further reference to FIG. 2, the interface SR is defined by the axial end portion 32A and the shaft 20. The interface SR is located at an axial end 32 of the rotor hub 31A. The interface SR does not extend over the entire mounting area of the rotor hub 31A on the shaft 20. As shown, a radial clearance 33 is defined between the shaft 20 and the rotor hub 31A. The radial clearance 33 extends from the interface SR at the axial end 32. As such, there is no radial contact between the rotor hub 31A and the shaft 20 immediately adjacent the interface SR. While this may be different in other embodiments, it may be desirable in at least some embodiments to concentrate the interface SR defining the interference fit at a selected location to facilitate assembly/disassembly of the rotor hub 31A on/from the shaft 20. Placing the interface SR at a distance AL away from the axial center AC and/or center of mass CM may limit at the interface SR the effects of the higher radial pull forces due to mass concentration close to the axial center AC and/or at the center of mass CM. This may in turn limit variations of the radial fit between the shaft 20 and the rotor hub 31A at the interface SR during operation of the engine 10 across a range of normal running conditions in at least some embodiments.

In order to promote and/or adjust the amount of deflection of the axial end portion 32A, an undercut feature 33A (or simply "undercut") is defined between the shaft 20 and the rotor hub 31A. The undercut 33A extends axially from adjacent the interface SR towards the axial center AC and/or the center of mass CM. The starting location of the undercut 33A from adjacent the interface SR may correspond to between 0% and 30% of the distance AL, in at least some embodiments, which may maximize the isolation of the interference fit from the mass concentration close to the axial center AC and/or center of mass CM. In an embodiment, such as shown, the undercut 33A extends from the interface SR (i.e. 0% of the distance AL). In other words, in the depicted embodiment, an axial end of the interface SR corresponds to that of the undercut 33A, which starts immediately therefrom. The undercut 33A is located in the deflectable region of the rotor hub 31A (as identified above). As shown, the undercut 33A defines a zone of radial increase of the radial clearance 33 in the deflectable region of the rotor hub 31A. The undercut 33A can be defined as a material removal area (or void) within the part in which it is defined. A greater radial clearance, at least locally in the vicinity of the interface SR may facilitate assembly/disassembly of the rotor hub 31A on the shaft 20, when desired. In the depicted embodiment, the undercut 33A is a groove defined in a shaft-facing surface 34 of the rotor hub 31A. The groove extends circumferentially about the shaft 20. The groove may extend about a full circumference of the shaft 20 or only part thereof, depending on the embodiment. In an embodiment, such as shown, the groove has an even depth surface extending between rounded end corners, which may limit stress concentrations. The groove may have other shapes in other embodiments. The undercut 33A may also be referred to as a channel, such as an annular channel, open towards the shaft 20, a close-ended slot facing the shaft 20, or an annular recess, for instance.

The dimensions of the undercut 33A may be tuned to minimize the radial pull of the rotor hub 31A at the location of the interface SR. In at least some embodiment, such as shown, the undercut 33A has an axial length LD taken along the central axis 11 between about 10% and about 50% of the distance AL of the interface SR from the axial center AC and/or the center of mass CM. In at least some embodiments, such as shown, the undercut 33A has a maximal radial depth UD between about 10% and about 50% of the radial thickness RD of the axial end portion 32 taken at a location aligned axially with the interface SR. In some cases, tuning of the undercut 33A dimensions may allow a reduction of the nominal tightness of the fit, i.e. "allowance", required to maintain a proper contact and fit between the shaft 20 and the rotor hub 31A across a full range of normal running conditions of the engine 10, taking into account thermal expansion of the parts (and thermal expansion differential between those parts), and radial pull due to high CF on those parts (and radial pull differential between those parts) during the operation of engines at high revolution speed (e.g. 12,000 rpm, or more). In this regard, the undercut 33A may be referred to as a "fit attenuator" feature. Such reduction of the allowance may facilitate installation of the rotor hub 31A on the shaft 20, as less thermal expansion of the inner diameter of the rotor hub 31A, hence less heating of the part may be required for assembly/disassembly.

In the depicted embodiment, the axial end portion 32A may be referred to as an arm portion of the rotor hub 31A extending along the shaft 20, away from the axial center AC and/or center of mass CM. Such axial end portion 32A may correspond to a front arm portion of the rotor hub 31A. The terms "front" in this context refers to the orientation of the rotor hub 31A relative to the engine 10. The axial end portion 32A could correspond to a rear arm portion of the rotor hub 31A in other embodiments.

In the depicted embodiment, the rotor hub 31A has such rear arm portion, shown at 35A in FIG. 2. The rear arm portion 35A extends away from the axial center AC and/or center of mass CM in a direction opposite to the front arm portion (here corresponding to axial end portion 32A) along the shaft 20. These portions 32A, 35A define portions of the rotor hub 31A extending from the respective axial ends of the rotor hub 31A towards the axial center AC and/or the center of mass CM. As shown, both the front and rear arm portions 32A, 35A have a respective radial thickness RD, RD2 smaller than that of the rotor hub 31A at an axial location aligned with the axial center AC and/or center of mass CM. In other words, the front and rear arm portions 32A, 35A are both tapering portions, or deflectable region, of the rotor hub 31A that extend away from the axial center AC and/or the center of mass CM.

In the depicted embodiment, the interface SR is a first interface, and the rotor hub 31A and the shaft 20 have at least a second interface SR2. As shown, the rear arm portion 35A and the shaft 20 define such second interface SR2. The interface SR2 is located at an opposite axial end of the rotor hub 31A with respect to the interface SR at the front arm portion. In the depicted embodiment, the interface SR2 is located on an opposite side of the axial center AC and/or the center of mass CM with respect to the first interface SR. In at least some embodiments, such second interface SR2 also define an interference fit, such that the rotor hub 31A may be coupled to the shaft via interference fit interfaces located at both axial ends thereof. In the depicted embodiment, the radial clearance 33 extends continuously from the first interface SR to the second interface SR2, such that the first interface SR and the second interface SR2 define the only two radial contact locations of the shaft 20 and the rotor hub 31A.

The undercut 33A in at least some embodiments may limit the axial footprint of the rotor hub 31A within the engine 10, i.e. rotor hub 31A having a more limited footprint along the shaft 20, and/or rotor hub 31A with shorter front and/or rear arm portion(s). The undercut 33A may compensate for the shorter distance AL between the axial center AC and/or center of mass CM and the interface(s). This may result in space and/or weight saving in rotor hub 31A designs.

While the fit attenuator feature described above was described in the context of the practical application of a compressor rotor coupled to the shaft 20, it should be understood that the present disclosure may apply to other rotary parts coupled one to another. It should also be understood that the interface(s) SR, SR2 defining the interference fits as described above may be between two rotary parts mounted on the shaft 20, such as a first rotary part interfacing between the shaft 20 and a second rotary part.

In accordance with the present disclosure, a method for controlling a radial pull in a rotary assembly 30 of an aircraft engine is presented. As discussed, the rotary assembly 30 has at least one rotary part 31 mounted to a shaft (e.g. shaft 20) for joint rotation about a central axis (e.g. axis 11). The at least one rotary part 31 and the shaft 20 have an interference fit. The method includes spacing a part-shaft interface (e.g. interface SR) defining the interference fit from a center of mass of the at least one rotary part 31 along the central axis. The method includes promoting a deflection of a portion of the at least one rotary part 31 via an undercut (e.g. undercut 33A) defined in the portion of the at least one rotary part 31 and extending from the part-shaft interface towards the center of mass.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present disclosure may apply to tune a radial fit, such as interference fit between other types of rotary parts, and/or control a radial pull distribution on a non-uniform rotary part coupled to another rotary part and impacted by high CF during operation. Yet further modifications could be implemented by a person of ordinary skill in the art in view of the present disclosure, which modifications would be within the scope of the present technology.

The invention claimed is:

1. A rotary assembly for an aircraft engine, the rotary assembly comprising:
   a shaft mounted for rotation about a central axis;
   a rotary part mounted on the shaft for common rotation with the shaft, the rotary part having an axial end portion extending away from a center of mass of the rotary part, the axial end portion having a radial thickness smaller than that of the rotary part at an axial location aligned with the center of mass, the shaft and the rotary part having an interface defining an interference fit between the shaft and the axial end portion of the rotary part, the interface located at a distance along the central axis from the center of mass; and an undercut defined in the rotary part, the undercut extending axially from adjacent the interface towards the center of mass, the undercut having an axial length taken along the central axis, the axial length being between about 10% and about 50% of the distance of the interface from the center of mass.

2. The rotary assembly as defined in claim 1, wherein the rotary part includes a rotor hub, wherein the axial end portion defines an arm portion of the rotor hub extending along the shaft, the arm portion and the shaft defining the interface.

3. The rotary assembly as defined in claim 1, further comprising a radial clearance between the rotary part and the shaft, the radial clearance extending axially from the interface, wherein the undercut defines a zone of radial increase of the radial clearance.

4. The rotary assembly as defined in claim 1, wherein the radial thickness of the axial end portion is taken at a location aligned with the interface, wherein the undercut has a maximal radial depth between about 10% and about 50% of the radial thickness.

5. The rotary assembly as defined in claim 1, wherein the undercut extends axially from the interface.

6. The rotary assembly as defined in claim 1, wherein the undercut is a groove defined in a shaft-facing surface of the rotary part, the groove extending circumferentially about the shaft.

7. The rotary assembly as defined in claim 1, wherein the axial location is an axial center of the rotary part.

8. The rotary assembly as defined in claim 1, wherein the interface is a first interface, the rotary part and the shaft having a second interface defining an interference fit between the shaft and the rotary part, the second interface located along the central axis on an opposite side of the center of mass with respect to the first interface.

9. A rotary assembly of an aircraft engine, comprising:
a shaft mounted for rotation about a central axis;
a rotor mounted on the shaft for common rotation, the rotor including a rotor hub coupled to the shaft, the rotor hub having an axial center and an arm portion extending away from the axial center;
an interface defining an interference fit between the shaft and the arm portion, the interface located at a distance along the central axis from the axial center;
an undercut defined in the rotor hub, the undercut extending from the interface towards the axial center, the undercut has an axial length taken along the central axis, the axial length being between about 10% and about 50% of the distance of the interface from the axial center; and
a radial clearance between the rotor hub and the shaft, the radial clearance extending from the interface, wherein the undercut defines a zone of radial increase of the radial clearance.

10. The rotary assembly as defined in claim 9, wherein the undercut has a radial depth between about 10% and about 50% of a radial thickness of the arm portion taken at location aligned with the interface.

11. The rotary assembly as defined in claim 9, wherein the undercut is a groove extending circumferentially about the shaft.

12. The rotary assembly as defined in claim 9, wherein the interface is a first interface, the rotor hub and the shaft having a second interface, the second interface defining an interference fit between the shaft and the rotor hub separate from the interference fit of the first interface, the second interface located along the central axis on an opposite side of the axial center with respect to the first interface.

13. The rotary assembly as defined in claim 12, wherein the arm portion is a front arm portion of the rotor hub, the rotor hub including a rear arm portion extending away from the axial center in a direction opposite to the front arm portion along the shaft, the rear arm portion and the shaft defining the second interface.

14. The rotary assembly as defined in claim 12, wherein the first interface and the second interface are located at respective axial ends of the rotor hub.

15. The rotary assembly as defined in claim 14, wherein the radial clearance extends continuously to the second interface.

16. The rotary assembly as defined in claim 9, wherein the rotor has a center of mass, wherein the rotor hub has a non-uniform mass distribution along the central axis, the axial center of the rotor hub aligned with the center of mass of the rotor.

17. A rotary assembly for an aircraft engine, the rotary assembly comprising:
a shaft mounted for rotation about a central axis;
a rotary part mounted on the shaft for common rotation with the shaft, the rotary part having an axial end portion extending away from a center of mass of the rotary part, the axial end portion having a radial thickness smaller than that of the rotary part at an axial location aligned with the center of mass, the shaft and the rotary part having an interface defining an interference fit between the shaft and the axial end portion of the rotary part, the interface located at a distance along the central axis from the center of mass; and
an undercut defined in the rotary part, the undercut extending axially from adjacent the interface towards the center of mass, wherein the radial thickness of the axial end portion is taken at a location aligned with the interface, and the undercut has a maximal radial depth between about 10% and about 50% of the radial thickness.

18. The rotary assembly as defined in claim 17, wherein the axial location is an axial center of the rotary part.

19. The rotary assembly as defined in claim 17, wherein the interface is a first interface, the rotary part and the shaft having a second interface defining an interference fit between the shaft and the rotary part, the second interface located along the central axis on an opposite side of the center of mass with respect to the first interface.

20. The rotary assembly as defined in claim 19, further comprising a radial clearance between the rotary part and the shaft, the radial clearance extending axially from the interface, wherein the undercut defines a zone of radial increase of the radial clearance, wherein the radial clearance extends continuously to the second interface.

* * * * *